United States Patent
Marze

(10) Patent No.: US 8,380,365 B2
(45) Date of Patent: Feb. 19, 2013

(54) METHOD AND A SYSTEM FOR DETERMINING AND INDICATING A SOUND NUISANCE LEVEL OUTSIDE AN AIRCRAFT

(75) Inventor: Henri-James Marze, Rognac (FR)

(73) Assignee: Eurocopter, Marignane Cedex (FR)

( * ) Notice: Subject to any disclaimer, the term of this patent is extended or adjusted under 35 U.S.C. 154(b) by 1438 days.

(21) Appl. No.: 11/905,700

(22) Filed: Oct. 3, 2007

(65) Prior Publication Data

US 2008/0269962 A1    Oct. 30, 2008

(30) Foreign Application Priority Data

Oct. 4, 2006 (FR) ...................... 06 08685

(51) Int. Cl.
- *G01C 23/00* (2006.01)
- *G06F 17/00* (2006.01)
- *B64C 19/00* (2006.01)
- *G08B 21/00* (2006.01)
- *G08B 23/00* (2006.01)

(52) U.S. Cl. ................ 701/3; 701/89; 701/14; 244/1 N; 340/945; 340/963

(58) Field of Classification Search .................. 701/1, 3, 701/5, 7, 8, 10, 14, 4, 9, 15; 244/1 N, 75.1, 244/174, 194; 340/945, 963, 964, 971
See application file for complete search history.

(56) References Cited

U.S. PATENT DOCUMENTS

| | | | |
|---|---|---|---|
| 6,198,991 B1 | 3/2001 | Yamakawa et al. |
| 6,317,703 B1 | 11/2001 | Linsker |
| 2003/0206640 A1 | 11/2003 | Malvar et al. |
| 2005/0098681 A1 | 5/2005 | Berson et al. |

FOREIGN PATENT DOCUMENTS

| | | |
|---|---|---|
| EP | 0 945 841 A1 | 9/1999 |
| JP | 6-206594 | 7/1994 |
| JP | 10-38671 | 2/1998 |
| WO | 2005/008194 A2 | 1/2005 |
| WO | 2005/100153 A2 | 10/2005 |

*Primary Examiner* — Thomas Tarcza
*Assistant Examiner* — Edward Pipala
(74) *Attorney, Agent, or Firm* — Brooks Kushman P.C.

(57) ABSTRACT

A method of determining a sound nuisance level outside an aircraft, wherein an aircraft is fitted with a plurality of external microphones, then during a flight of the aircraft, sound levels are measured using on-board microphones and at least two components are measured of the speed of the aircraft relative to air, and thereafter the kurtosis of samples of the sound level measurements is calculated and a model is determined of variations in a sound nuisance level as function of the air speed components, with the sound nuisance level being determined as a function of the kurtosis.

20 Claims, 3 Drawing Sheets

METHOD AND A SYSTEM FOR DETERMINING AND INDICATING A SOUND NUISANCE LEVEL OUTSIDE AN AIRCRAFT

The present invention relates to a method and to a system for determining and indicating a sound nuisance level outside an aircraft.

The technical field of the invention is that of manufacturing helicopters.

BACKGROUND OF THE INVENTION

The present invention relates more particularly to a method and to a system for determining data representative of a sound nuisance level that would be felt by a human situated out of a rotorcraft.

A considerable amount of work has been performed in an attempt to control the sound level produced by an aircraft and to attenuate the corresponding perceived nuisance.

Various systems relating to the noise generated by an aircraft are described in the following patents: US 2005/0098681, U.S. Pat. No. 6,198,991, EP 0 945 841, JP 10 038 671, and JP 6 206 594.

Patents FR-2 868 561 and WO 2005/100153 describe a method of minimizing the noise emitted while a rotorcraft is taking off or landing, and they also describe a device for implementing the method.

In the method described, various sound levels are measured, and where appropriate weighted, as detected by a plurality of microphones secured outside the rotorcraft, and for various configurations that differ in terms of rotorcraft mass and rotor speeds of rotation.

Thereafter, diagrams are drawn up of acoustic "isolevels" in a coordinate system based on path air speed and on vertical air speed, while making corrections for noise and apparent mass.

Thereafter, flight ranges are determined as a function of the corresponding diagrams so as to correspond to an acceptable maximum noise level.

During a flight, piloting instructions are determined on the basis of measuring two air speed components, of the instantaneous mass of the rotorcraft, and of the previously-recorded flight ranges; these instructions are displayed on a screen, and where appropriate they are transmitted to an autopilot.

Although that method is advantageous, it does not enable the pilot to take account of the nuisance that is liable to result for a human from the sound level of the rotorcraft.

The present invention seeks to remedy this shortcoming.

The invention also seeks to provide an on-board system for determining and informing the pilot of an aircraft, in real time, about the nuisance level likely to be caused by the aircraft in operation, in a manner that is simplified and/or improved, and/or that remedies, at least in part, the shortcomings or the drawbacks of prior systems.

OBJECTS AND SUMMARY OF THE INVENTION

In one aspect, the invention provides a method of determining a sound nuisance level outside an aircraft, in which method:

an aircraft is fitted with a plurality of external microphones (or equivalent sensors); and then during a reference flight of the aircraft, sound levels are measured using the on-board microphones and at least two components of the speed of the aircraft relative to air ("air speed") are also measured (or estimated), and where appropriate the mass of the aircraft is measured;

the kurtosis of samples of the measured sound levels is subsequently calculated, and a model is determined of variations in a sound nuisance level as a function of the air speed components, and where appropriate of the mass of the aircraft, with the sound nuisance level being determined (calculated) as a function of the kurtosis.

In preferred implementations of a method of the invention:

the signals delivered by the microphones may be sampled at a frequency of not less than 5 kilohertz (kHz), 10 kHz, or 20 kHz;

a plurality of models may be established and a plurality of kurtoses may be calculated, each model being determined from variations in a kurtosis, each kurtosis being calculated for one of the microphones; by way of example, it is possible to measure the sound level on the port side of the aircraft and the sound level on the starboard side of the aircraft; on a rotorcraft, it is possible to measure sound level close to the main rotor and the sound level close to the tail rotor; it is then possible to calculate respective kurtoses of samples for each of said series of measurements:

before calculating kurtosis, it is possible to attenuate the low frequency components of the sound level measurement signal(s);

the kurtosis may be weighted and/or peak-limited, and the model may be determined as a function of the weighted or peak-limited kurtosis;

weighting A, B, C, or D may be applied to the sound level measurement signal(s);

the weighted sound level may be added to the kurtosis, after weighting or peak-limiting, where appropriate, and the model may be determined as a function of the results obtained;

the model may consist essentially in level curves for kurtosis, where appropriate after weighting, and/or peak limiting, and/or adding a sound level weighted with weighting A, B, C, or D, for example.

In another aspect, the invention provides a method of indicating on board an aircraft a level of sound nuisance outside the aircraft, in which method:

two components of the air speed of the aircraft, and where appropriate of the mass of the aircraft, are measured and/or estimated;

a sound nuisance level is calculated on the basis of a model of variation in the kurtosis of sound level as a function of air speed components, and where appropriate of the mass of the aircraft, and from measured and/or estimated air speed components, and where appropriate the mass of the aircraft; and the calculated sound nuisance level is displayed on an on-board indicator.

In a preferred implementation, the model is obtained by a method of determining the sound nuisance level as defined and/or described herein.

The method of determining the nuisance level and/or the method of indicating the nuisance level may be implemented by an electronic data processor unit such as a computer operating under the control of a program.

Thus, in another aspect, the invention provides a program comprising code recorded on a medium, such as a memory, or embodied by a signal, the code being readable and/or executable by at least one data processor unit, such as a processor on board or suitable for mounting on board an aircraft, in order to determine a sound nuisance level outside the aircraft, the code comprising:

a first code segment, or read module, for reading first data representative of measured sound levels and second data representative of measured aircraft speed components;

a second code segment, or calculation module, for determining and/or calculating the kurtosis of the first data and for determining, as a function of the kurtosis, third data representative of a sound nuisance level; and a third code segment, or write module, for recording the second and third data.

The program may comprise respective code segments for performing the various operations of a method of the invention for determining sound nuisance level.

In another aspect, the invention provides a program comprising code recorded on a medium, such as a memory, or embodied by a signal, the code being readable and/or executable by a data processor unit, such as a processor, on board or suitable for mounting on board an aircraft, in order to indicate on board an aircraft a level of sound nuisance outside the aircraft, the code comprising:

a first segment of code, or read module, for reading fourth data representative of measured components of the air speed of the aircraft;

a second code segment, or calculation module, possibly including an interpolation module, for calculating at least one sound nuisance data value from data concerning variation as a function of air speed components, in a sound nuisance level previously determined as a function of the sound level kurtosis, and from the fourth data; and a third code segment, or indicator control module, for controlling a display and/or indicator as a function of the calculated sound nuisance data value.

The program may comprise respective code segments for performing the various operations of a method of the invention for indicating a sound nuisance level.

In another aspect, the invention provides an on-board indicator system on board an aircraft for indicating a sound nuisance level outside the aircraft, the system comprising:

a member for measuring and/or reading air speed components of the aircraft;

a database representing variations in a sound nuisance level;

a device for displaying indications concerning sound nuisance level; and a calculation member connected to the measurement member, to the database, and to the display device, and programmed to calculate a sound nuisance level from the data of the database and from air speed measurements, and to control the display of the calculated sound nuisance level on the display device.

The invention serves in particular to estimate a sound nuisance level as a function of instantaneous ("real time") flight parameters (mass, speed) without measuring sound level, and indicating to the pilot of the aircraft an estimated nuisance level.

A few hours of flight can suffice to build up the database that is characteristic of a particular type of aircraft; the database contains a small quantity of data and can easily be recorded in a memory associated with a computer of an aircraft of the same type for subsequent use in estimating and indicating to the pilot a noise level that is estimated as a function of values taken by the flight parameters.

BRIEF DESCRIPTION OF THE DRAWINGS

Other aspects, characteristics, and advantages of the invention appear from the following description that refers to the accompanying drawings showing, without any limiting character, preferred implementations of the invention.

MORE DETAILED DESCRIPTION

Figure 1:
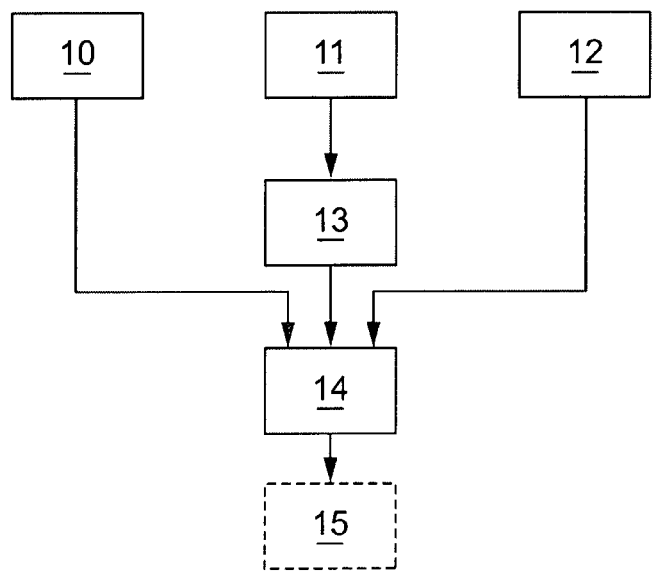
FIG. 1 is a diagram showing the main components of a system for determining a level of external sound nuisance and how they interoperate in order to implement a method of the invention and generate a sound nuisance database that can be taken on board.
Figure 3:
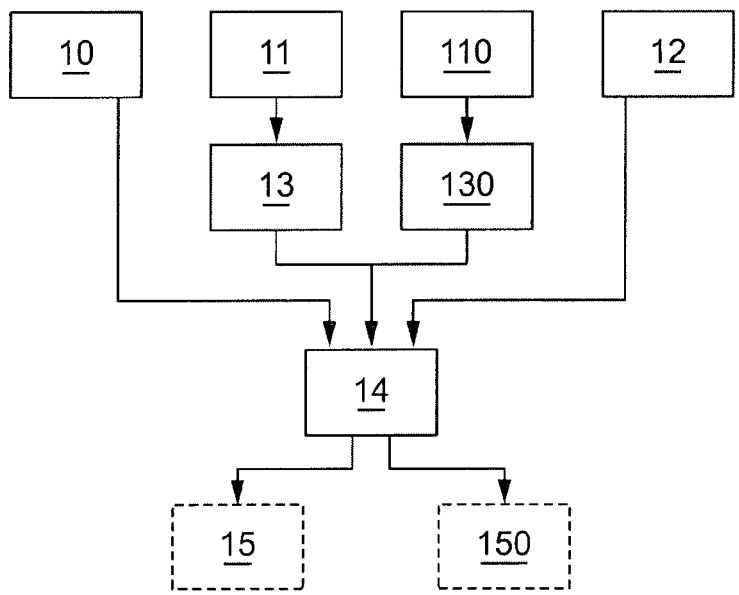
FIG. 3 is a diagram similar to FIG. 1 for estimating two nuisance levels from two series of samples delivered respectively by two on-board microphones.

With reference to FIGS. 1 and 3 in particular, the system for determining a sound nuisance level comprises an on-board member 10 for estimating the current apparent mass of a rotorcraft, one or two on-board members 11, 110 for measuring noise outside the rotorcraft, and a member 12 for measuring or estimating the air speed of the rotorcraft along its path and also its vertical speed relative to air.

For this purpose, the member 10 may be connected to a fuel gauge; each member 11, 110 may be a microphone secured to the fuselage of the rotorcraft.

The member 12 may be integrated in or connected to an instantaneous vertical speed indicator and an air data computer.

The sound level measurement samples and/or data delivered by the sensors 11, 110 are input to a module 13, 130 for estimating a sound nuisance level and operating in a manner that is described in detail below with reference to FIG. 5.

These measurements may be taken during a single reference flight. They do not need to be renewed unless there is a fundamental change in the configuration of the aircraft, for example installing an external weapon.

The nuisance level data delivered at the output from the module 30, 130 is transmitted together with the speed data from the member 12 and the mass data from the member 10 to constitute inputs to a module 14 that outputs a model that is recorded in the form of a database 15, 150 specifying variations in nuisance level corresponding to the data received from the modules 13, 130 as a function of the apparent mass data received from the member 10 and the data concerning speed components received from the member 12.

The module 14 may be integrated in full or in part in a computer situated on the ground.

Figure 2:
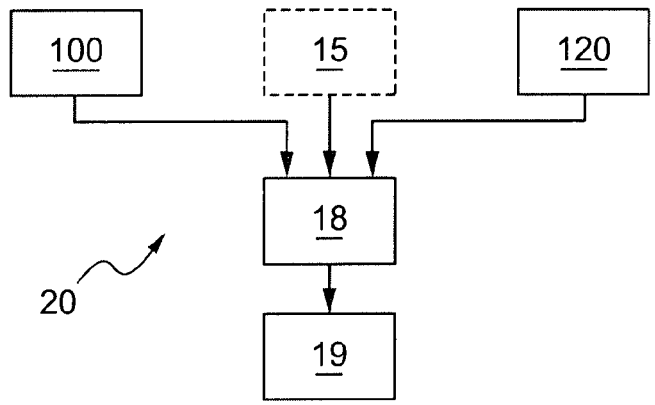
FIG. 2 is a diagram showing the main components of a system for giving a real-time indication of the sound nuisance as estimated in accordance with the invention.
Figure 4:
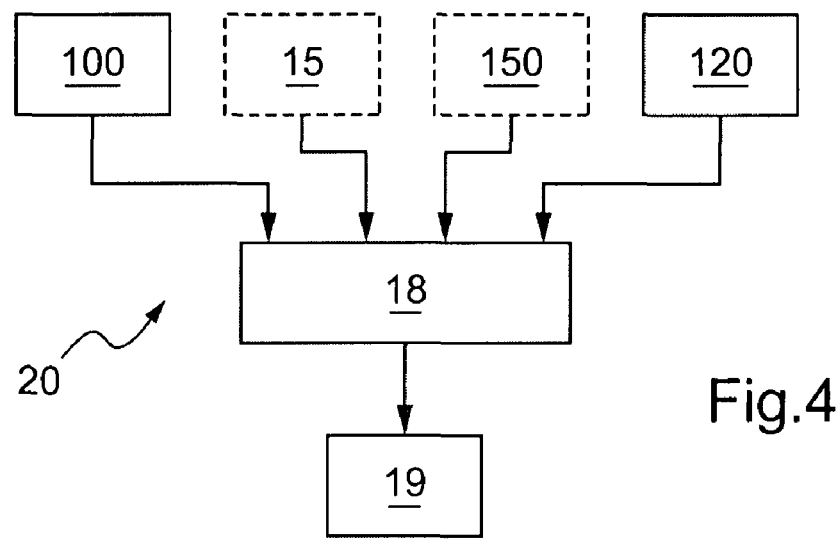
FIG. 4 is a diagram similar to that of FIG. 2, for indicating one or two sound nuisance levels obtained by the system of FIG. 3.

With reference to FIGS. 2 and 4 in particular, in operation, after the database 15, 150 has been built up, the database is mounted on board a rotorcraft fitted with a member 100 for measuring/collecting "instantaneous" apparent mass data and a member 120 for measuring/collecting "instantaneous" air speed components, which members are identical or similar to the above-mentioned members 10, 12.

The data delivered by the members 100, 120 is delivered to a module 18 for estimating sound nuisance level; this level is estimated at regular time intervals from the data in the database 15, 150 as a function of the mass and speed data delivered by the members 100 and 120.

The estimated nuisance level is then presented of the pilot in the form of one or more visual indicators of sound nuisance level, on a display device 19 controlled by the module 18.

When a plurality of models corresponding to a plurality of series of sound measurements are recorded in the database 15, 150, the display may be organized/controlled to display the highest of the estimated nuisance levels; it is also possible for the display to be organized to display the nuisance level corresponding to selection data input into the computer by the pilot, or indeed to display a plurality of estimated nuisance levels simultaneously.

The color (e.g. red or green) of the visual indicator may be determined automatically as a function of the sound nuisance level so as to draw the attention of the pilot when the estimated nuisance level is high. For the same purpose, at least one dimension of the indicator, such as its height, is preferably caused to vary so as to increase with increasing estimated nuisance level.

Figure 5:
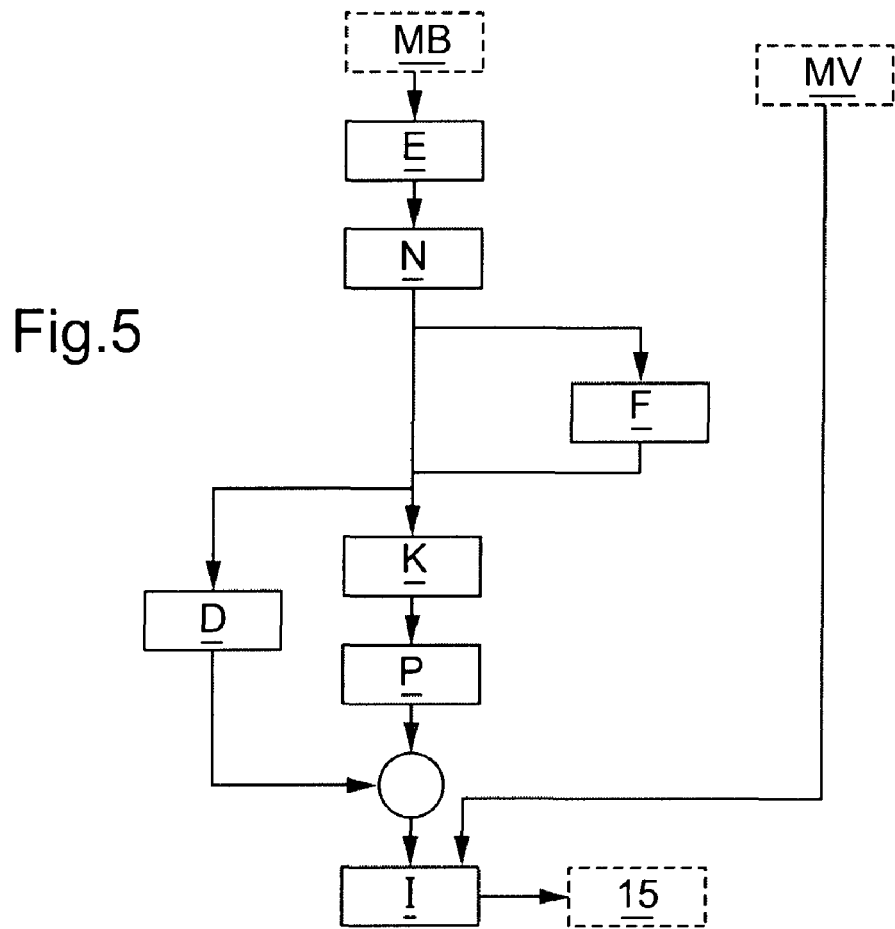
FIG. 5 shows in greater detail how data is processed for determining a sound nuisance level from measurements of external noise level.
Figure 6:
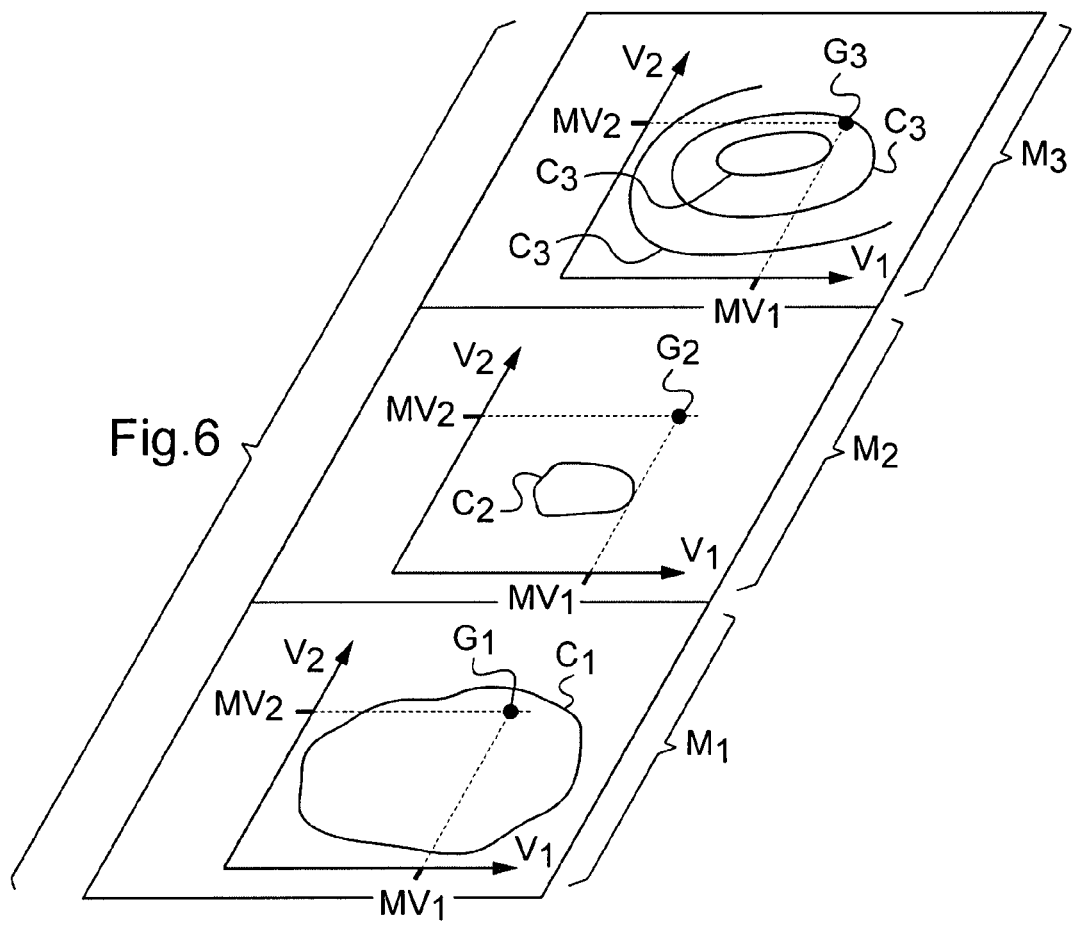
FIG. 6 shows three portions of a model of sound nuisance corresponding respectively to three distinct masses for the same rotorcraft, each model including one or more "isolevel" curves interconnecting points lying in a plane identified by the values of two air speed components and for which sound nuisance level is substantially constant.
Figure 8:
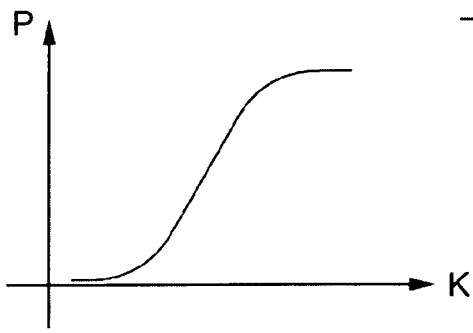
FIG. 8 is a graph showing an example of a weighting function usable for weighting and/or peak limiting kurtosis values.

With reference to FIG. 5 in particular, a sound nuisance level may be determined as a function of sound level measurements by performing the following operations:

sampling E noise measurements MB at a frequency of at least 5 kHz;
digitizing N of the sampled signals;
possibly after filtering F, calculating the kurtosis K of the digitized samples; for a set of n digitized values $\{x_i\}$ having mean written x, kurtosis K is generally calculated by:

$$K = \frac{n \sum_{1}^{n} (x_i - x)^{-1}}{\left[\sum_{1}^{n} (x_i - x)^2\right]^2}$$

the resulting kurtosis values can be weighted by a weighting function P such as the function illustrated by the graph of FIG. 8; and
the kurtosis value as weighted and/or peak-limited in this way is used, as are the speed component measurements MV taken simultaneously with the sound level measurements MB, by a compression/vectorization module I that determines the curves C1, C2, C3 shown in FIG. 6 in a frame of reference corresponding to the components V1 and V2 of the air speed, in such a manner that on any one of said curves, all of the points correspond to a (weighted) kurtosis having the same value.

The data corresponding to these curves in the plane V1, V2 is recorded to form the database 15, 150.

As shown diagrammatically in FIG. 6, the data of the database 15, 150 may comprise a plurality of arrays of curves C1, C2, C3, with each array corresponding to a distinct apparent mass M1, M2, M3 of the rotorcraft.

Thus, when using said on-board database, it is possible, for each of three apparent masses for which the database has been built up, to determine a kurtosis level (nuisance level) as a function of the values MV1, MV2 of the air speed components of the aircraft as measured at a given instant.

This thus provides three nuisance level values G1, G2, G3 that correspond, for the measured flight conditions, respectively to the values M1, M2, and M3 for apparent mass.

Figure 7:
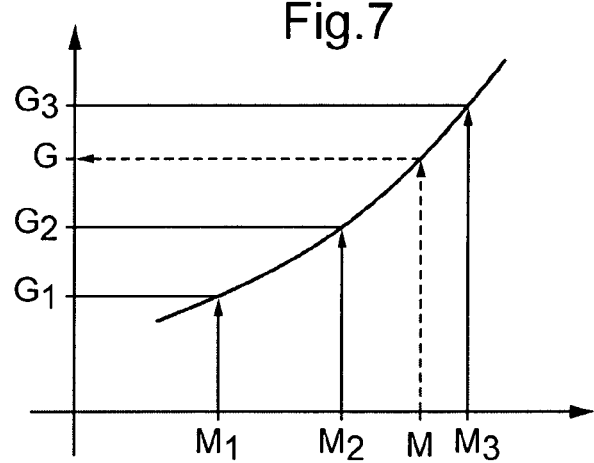
FIG. 7 shows an example of determining an instantaneous level of sound nuisance, by interpolating between sound nuisance values corresponding to points of a model (i.e. data from a database corresponding to the model).

By interpolation, the estimated sound nuisance level G is determined as a function of the present measured value M for the apparent mass of the aircraft (cf. FIG. 7).

With reference to FIG. 5, it is also possible to add to the weighted kurtosis, the digitized sound level (possibly after filtering) as weighed by weightings A, B, C, or D so as to obtain estimated nuisance levels used for recording the model of the database 15, 150.

What is claimed is:

1. A method of indicating, on board an aircraft, an instantaneous sound nuisance level outside the aircraft, the method comprising:
   measuring two components of an instantaneous airspeed of the aircraft;
   estimating an instantaneous mass of the aircraft;
   during a reference flight of the aircraft, taking a plurality of external sound measurements using external microphones on board the aircraft;
   providing on board the aircraft a model database including a model for determining the sound nuisance level outside the aircraft, the model being derived from the plurality of external sound measurements;
   sampling the plurality of external sound measurements into external sound measurement samples;
   calculating a kurtosis of at least one of the external sound measurement samples;
   during a flight of the aircraft, using the model to determine an instantaneous sound nuisance level outside the aircraft based on the instantaneous measured airspeed and the estimated instantaneous mass of the aircraft; and
   during a flight of the aircraft, displaying the determined instantaneous sound nuisance level outside the aircraft in real time on an indicator inside the aircraft.

2. The method according to claim 1, in which a plurality of models are established and a plurality of kurtoses are calculated, each said model being determined on the basis of variations in one kurtosis, each kurtosis being calculated for one of the microphones, the plurality of models being provided in the model database on the aircraft.

3. The method according to claim 1, in which, prior to calculating the kurtosis, low-frequency components of the external sound measurement samples are attenuated.

4. The method according to claim 1, in which the kurtosis is weighted and the model is determined as a function of the weighted kurtosis.

5. The method according to claim 1, in which the kurtosis is peak limited, and the model is determined as a function of the peak-limited kurtosis.

6. The method according to claim 1, in which the model comprises kurtosis level curves.

7. The method according to claim 1, in which the sound nuisance level determination includes an operation of interpolating values.

8. The method according to claim 1, in which at least one of the external sound measurement samples is weighted.

9. The method according to claim 8, in which the weighted external sound measurement sample is added to the kurtosis and the model is determined as a function thereof.

10. The method of claim 9, in which the kurtosis is weighted and the weighted external sound measurement sample is added to the weighted kurtosis.

11. The method according to claim 9, in which the kurtosis is peak limited and the weighted external sound measurement sample is added to the peak limited kurtosis.

12. A system on board an aircraft for indicating in real-time a sound nuisance level outside the aircraft, the system comprising:
- a member for measuring two components of instantaneous air speed of the aircraft for which an instantaneous mass of the aircraft has been estimated;
- a model database including a model of sound nuisance level outside the aircraft, the model being derived from a plurality of external sound measurement samples taken during a reference flight of the aircraft using external microphones on board the aircraft;
- means for determining a kurtosis of the plurality of external sound measurement samples;
- a calculation member connected to the member for measuring and to the model database, said calculation member using the model to determine an estimated sound nuisance level outside the aircraft based on the kurtosis, the components of airspeed, and mass of the aircraft; and
- an indicator inside the aircraft and connected to the calculation member that indicates, during a flight of the aircraft, the determined sound nuisance level outside the aircraft in real time.

13. The system of claim 12, wherein the indicator includes at least two colors that indicate different values of the determined sound nuisance level outside the aircraft.

14. The system of claim 12, wherein the indicator includes a display whose size varies depending on the determined sound nuisance level outside the aircraft.

15. A method of indicating, on board an aircraft, an instantaneous sound nuisance level outside the aircraft, the method comprising:
- measuring two components of an instantaneous airspeed of the aircraft;
- estimating an instantaneous mass of the aircraft;
- during a reference flight of the aircraft, taking a plurality of external sound measurements using external microphones on board the aircraft;
- providing on board the aircraft a model database including a model for determining the sound nuisance level outside the aircraft, the model being derived from the plurality of external sound measurements;
- sampling the plurality of external sound measurements into external sound measurement samples;
- calculating a kurtosis of at least one of the external sound measurement samples;
- during a flight of the aircraft, using the model to determine an instantaneous sound nuisance level outside the aircraft based on the kurtosis, the instantaneous measured airspeed, and the estimated instantaneous mass of the aircraft; and
- during a flight of the aircraft, displaying the determined instantaneous sound nuisance level outside the aircraft in real time on an indicator inside the aircraft.

16. The method according to claim 15, in which a plurality of models are established and a plurality of kurtoses are calculated, each said model being determined on the basis of variations in one kurtosis, each kurtosis being calculated for one of the microphones, the plurality of models being provided in the model database on the aircraft.

17. The method according to claim 15, in which, prior to calculating the kurtosis, low-frequency components of the external sound measurement samples are attenuated.

18. The method according to claim 15, in which the kurtosis is weighted and the model is determined as a function of the weighted kurtosis.

19. The method according to claim 15, in which the kurtosis is peak limited, and the model is determined as a function of the peak-limited kurtosis.

20. The method according to claim 15, in which at least one of the external sound measurement samples is weighted, and the weighted external sound measurement sample is added to the kurtosis and the model is determined as a function thereof.

* * * * *